United States Patent
Kishima

[11] Patent Number: 5,253,313
[45] Date of Patent: Oct. 12, 1993

[54] OPTICAL GUIDE APPARATUS

[75] Inventor: Koichiro Kishima, Kanagawa, Japan

[73] Assignee: Sony Corporation, Tokyo, Japan

[21] Appl. No.: 871,479

[22] Filed: Apr. 21, 1992

[30] Foreign Application Priority Data

Apr. 26, 1991 [JP] Japan ................. 3-097738

[51] Int. Cl.[5] ............................................. G02B 6/32
[52] U.S. Cl. ........................................ 385/38; 385/33; 385/93
[58] Field of Search .............. 385/33, 38, 93, 122; 359/326, 328, 332; 372/21

[56] References Cited

U.S. PATENT DOCUMENTS

| | | | |
|---|---|---|---|
| 4,673,244 | 6/1987 | Miles | 385/38 |
| 4,807,954 | 2/1989 | Oyamada et al. | 385/38 X |
| 4,984,885 | 1/1991 | Ortiz, Jr. | 356/153 |
| 5,048,908 | 9/1991 | Blonder et al. | 385/39 |

Primary Examiner—Frank Gonzalez
Attorney, Agent, or Firm—Philip M. Shaw, Jr.

[57] ABSTRACT

An optical guide end-fire coupling apparatus including a light source section having a condenser lens system for converging a laser beam to be incident on an optical guide, having a first light incident end facet, of an optical guide device, having a second light incident end facet, and including an actuator for finely adjusting the position of the condenser lens system with respect to an optical, i.e. a z axis of the condenser lens system, an x axis and a y axis, which axes are all orthogonal with each other and a photodetector assembly for detecting a light intensity of a return beam of a laser beam which is emitted from the light source section and reflected by the second light incident end facet on which the first light incident end facet of the optical guide is facing, and for controlling the actuator in accordance with the detected light intensity so that the position of the actuator is adjusted with respect to the x, y and z axes.

4 Claims, 7 Drawing Sheets

OPTICAL GUIDE APPARATUS

BACKGROUND OF THE INVENTION

1. Field of the Invention

The present invention generally relates to optical guide apparatuses and, more particularly, is directed to an optical guide apparatus or an optical guide end-fire (transversal) coupling apparatus for making a laser beam of a fundamental wave be incident on an optical guide device having an optical guide such as an optical guide type secondary harmonic generator (SHG).

2. Description of the Related Art

In the optical guide device having an optical guide such as an optical guide SHG, a waveguide mode type SHG a Cherenkov radiation type SHG, or the like, with respect to an incident laser light, for example, the fundamental wave of the incident light on the optical guide is very important.

Namely, since the power Pw of the secondary harmonics generated by the SHG, for example, is proportional to the square of the power Pw of the incident light wave, it is very important to make the incident light be incident in the optical guide with a high efficiency, Further, the output light quantity of the optical guide is greatly influenced by the fluctuation of the incident light power, that is, the fluctuation of the light quantity being incident on the optical guide.

Furthermore, in this type of optical guide device, its optical source unit, particularly, its condenser lens system (object lens system) is generally fixedly mounted on the optical guide apparatus by a bonding agent in a state that it is positioned relative to an end facet of the optical guide device. Thus, if the condenser lens system is deviated from its correct position due to vibration applied thereto or a change in ambient temperature or the like, the apparatus becomes inoperable in use.

OBJECTS AND SUMMARY OF THE INVENTION

Therefore, it is an object of the present invention to provide an improved optical guide end-fire coupling apparatus in which the aforementioned shortcomings and disadvantages encountered with the prior art can be eliminated.

More specifically, it is an object of the present invention to provide an optical guide end-fire coupling apparatus which is able to make a light, in particularly, a laser light from a light source be incident on the optical guide of an optical guide device with a high efficiency and stability.

It is another object of the present invention to provide an optical guide end-fire coupling apparatus which, in addition to rough adjustment of the position of a light source with respect to the optical guide of the optical guide device, is able to adjust finely and surely the position of an optical axis and the position along the optical axis (that is, the focusing position) of a condenser lens system, that is, an object lens for converging and making the laser light from the light source incident on the optical guide.

As an aspect of the present invention, an optical guide end-fire coupling apparatus, including an optical source section having a condenser lens system for converging and making a radiated laser beam incident on an optical guide of an optical guide device, is comprised of an actuator for finely adjusting the position of the condenser lens system along an optical axis thereof, that is, a z axis an x axis and a y axis which are orthogonal with each other and a unit for detecting a light quantity or a light quantity distribution of a return beam of a laser beam which is radiated from the optical source section and reflected by an end facet of the optical guide device on which a light incident end facet of the optical guide is facing, and for controlling the actuator in accordance with the detected light quantity or light quantity distribution so that the position of the actuator is adjusted along the x, y and z axes.

According to this invention, since the condenser lens system of the optical source section is adjusted in its position by the actuator and further the actuator is controlled in accordance with the detected light quantity or light quantity distribution of the return beam of the laser beam which is reflected from the optical guide device, the laser beam can be surely focused and be incident on the optical guide of the optical guide device. Thus, the laser beam can be incident on the optical guide with an improved efficiency, so that it is possible to obtain a larger power of the secondary harmonics stably when the optical guide end-fire coupling apparatus according to the present invention is applied to the SHG, for example. Further, since a conventional adjusting method of fixedly mounting the optical source unit, particularly, the condenser lens system on the apparatus by a bonding agent is not employed, the condenser lens system can be adjusted swiftly at its best position surely even when it is deviated from its correct position due to vibration applied thereto or change in ambient temperature or the like, whereby the optical guide end-fire coupling apparatus according to the present invention can always make the stable light quantity be incident on the optical guide for a long time to thereby operate the optical guide device stably. Furthermore, since the condenser lens system can be positioned finely with respect to the optical guide device by the actuator, the accuracy of the first positioning operation of the condenser lens system, that is, the rough adjustment of the positioning operation can be made less than one tenth than the desired accuracy.

The preceding and other objects, features, and advantages of the present invention will become apparent from the following detailed description of an illustrative embodiment thereof when read in conjunction with the accompanying drawings, in which like reference numerals are used to identify the same or similar parts in the several views.

DESCRIPTION OF THE PREFERRED EMBODIMENT

An embodiment of the optical guide end-fire coupling apparatus according to the present invention will be described with reference to the accompanying drawings.

Figure 1:
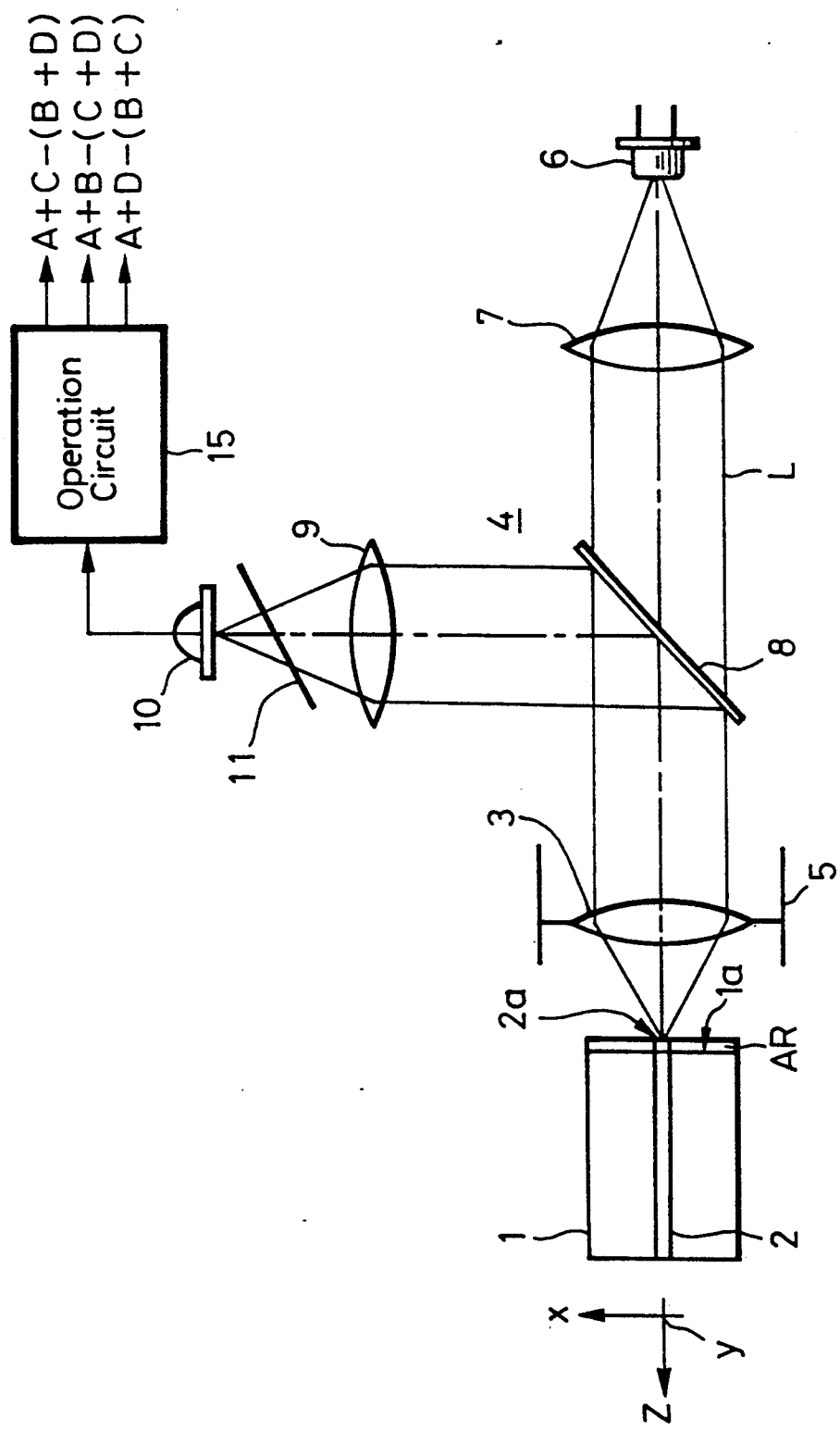
FIG. 1 shows a schematic diagram of an embodiment of an optical guide end-fire coupling apparatus according to the present invention.

FIG. 1 of the accompanying drawings shows an arrangement of the embodiment of the present invention. Referring to FIG. 1, a light source section 4 is disposed opposite to a light incident end facet 1a of an optical guide device 1.

Figure 2:
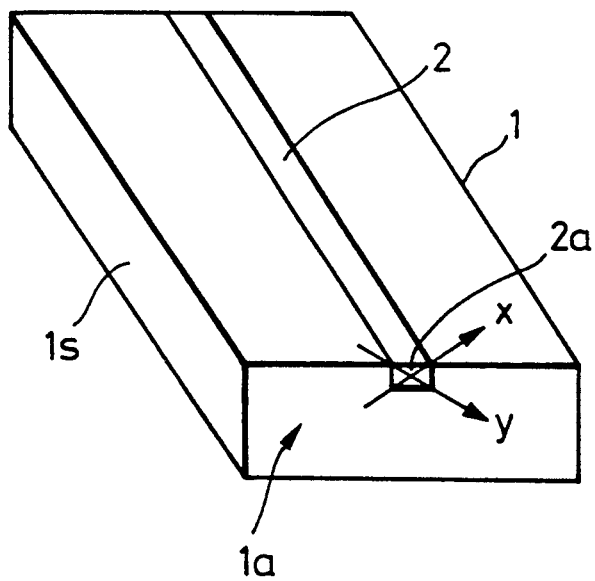
FIG. 2 is a schematic perspective view of an example of an optical guide device.

The optical guide device 1, as shown in FIG. 2, may be a wave guide mode type SHG a Cherenkov radiation type SHG, which may be constituted by providing a channel type linear or nonlinear optical guide 2 on a substrate is made of nonlinear optical crystal, for example. A light incident end facet 2a of the optical guide 2 is provided so as to be coplanar with the light incident end facet 1a of the optical guide device 1.

As shown in FIG. 1, the light source section 4 is so constituted, for example, that a laser light or beam L generated from a semiconductor laser 6 is passed to a condenser lens system 3 through a collimator lens 7 and a half mirror 8 and then focused by the condenser lens system 3 on the light incident end facet 2a of the optical guide 2 facing to the end facet 1a of the optical guide device 1. The condenser lens system 3 is finely movable by an actuator 5 along its optical axis, that is, a z axis and x and y axes which are perpendicular to the z axis and with each other.

A return light beam reflected from the end facet 1a is modified into, for example, a parallel beam by the condenser lens 3, then reflected by the half mirror 8 to be incident on an optical detector 10 through another condenser lens system 9.

Figure 3A:
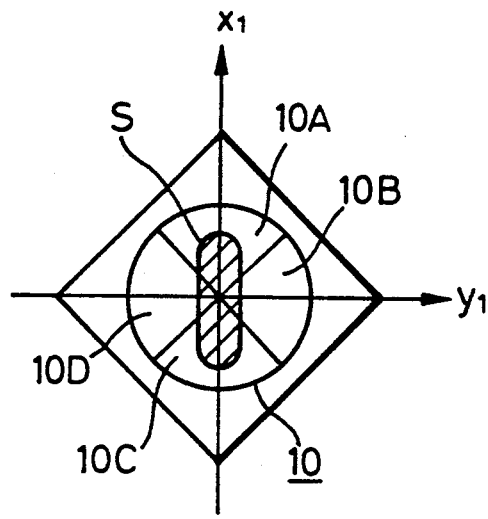
FIGS. 3A to 3C each is a schematic plan view of a photo detector illustrating a return light spot irradiated on four photo diodes thereof.
Figure 3B:
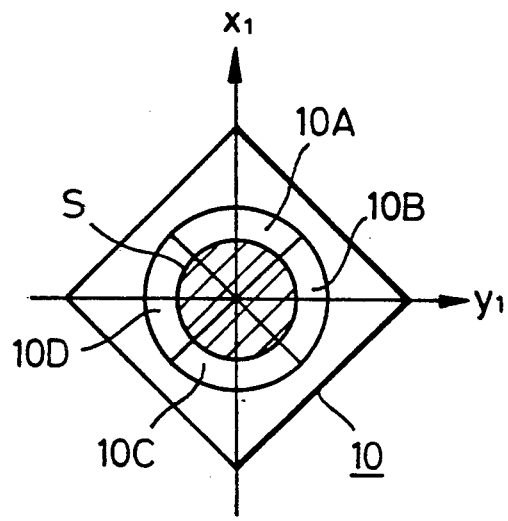
Figure 3C:
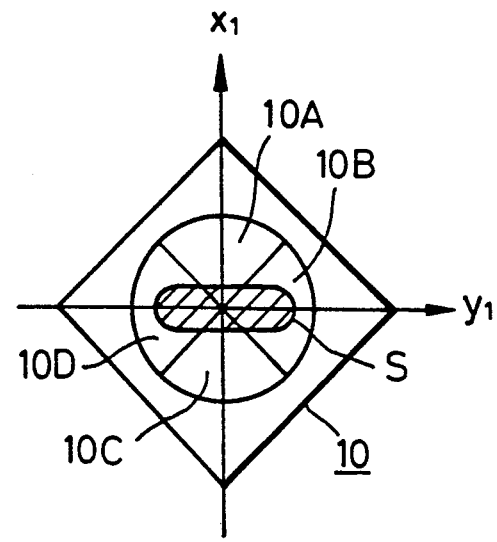

FIGS. 3A to 3C each shows a schematic plan view of the photo detector 10 illustrating the return beam spot irradiated on four photo diodes thereof. The optical detector 10 is constituted as shown in FIGS. 3A to 3C, for example, by the four photo diodes 10A to 10D which are disposed symmetrically one another with respect to x1 and y1 axes crossing orthogonally.

As shown in FIG. 1, an astigmatism generator 11 is disposed between the condenser lens 9 and the photo detector 10 so that a beam spot S (FIGS. 3A–3C) radiated on the photo detector 10 is distorted when an optical axis of the return beam being incident on the photo detector 10 is deviated from an intersection point (origin) of the x1 and y1 axes.

Figure 4:
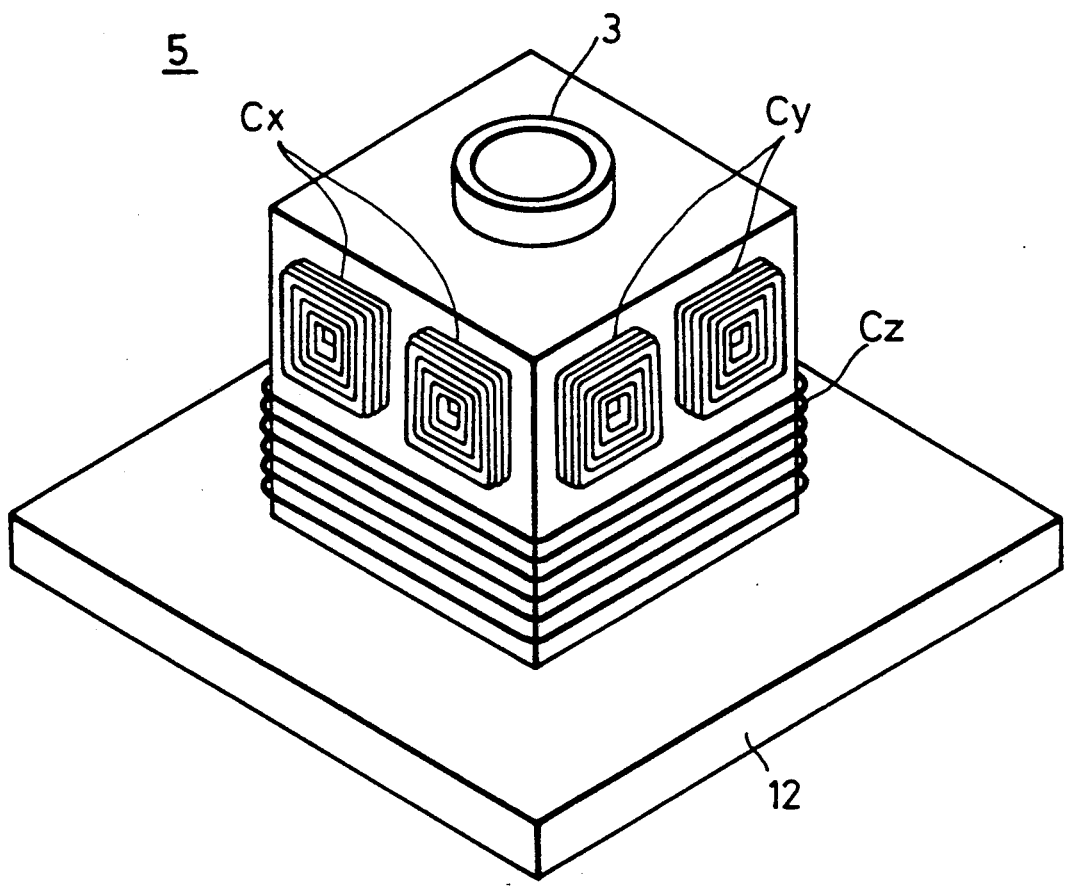
FIG. 4 is a schematic perspective view of an example of an actuator.
Figure 5:
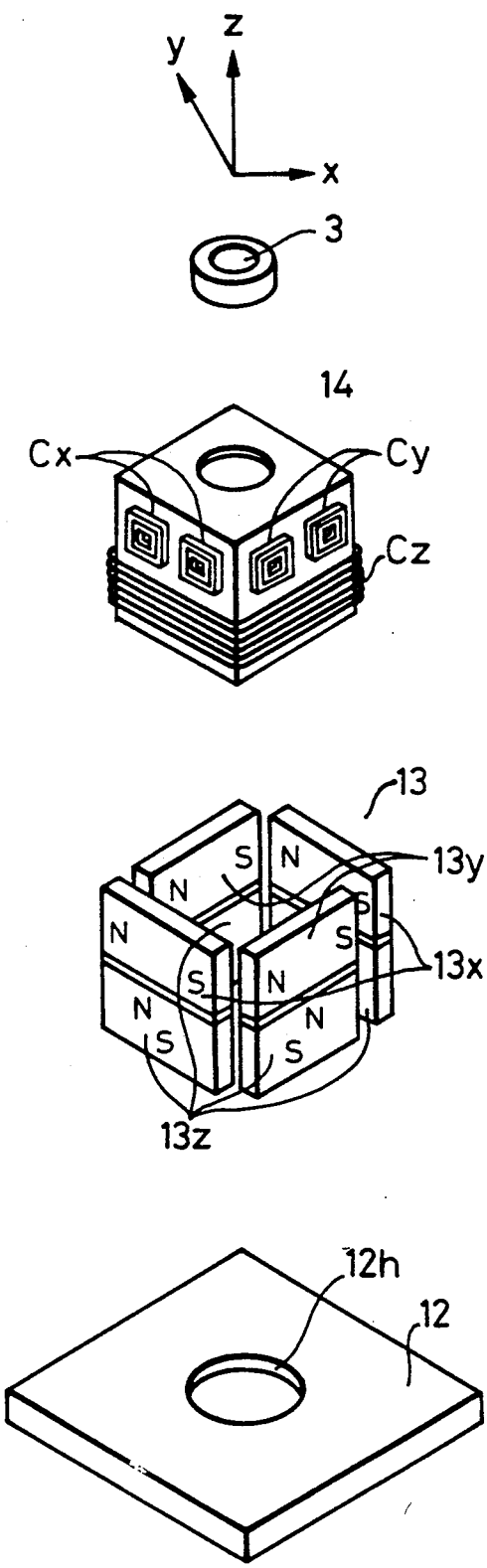
FIG. 5 is an exploded perspective view of the actuator shown in FIG. 4.

FIG. 4 is a schematic perspective view of an example of the actuator 5 and FIG. 5 is an exploded perspective view thereof. As shown by FIGS. 4 and 5, the actuator 5 is constituted in a manner as described below. Firstly, a magnet unit 13 is fixedly mounted on a fixing table 12 having a central hole 12h for passing the laser beam L therethrough. Then, a coil block 14 having a z-axis direction servo coil, that is, a focusing servo coil Cz, x-axis servo coils Cx and y-axis servo coils Cy is disposed so as to cover the magnet unit 13, and then the condenser lens system or objective lens system 3 is mounted on a top surface of the coil block 14 so as to pass the laser beam L therethrough.

The coil block 14 is movably supported on the fixing table 12 by a suitable spring mechanism (not shown) so that it is movable in orthogonal directions, that is, the optical axis direction of the lens system 3, (z axis direction) and the x and y axis direction, each of which are perpendicular to the Z axis direction.

The z-axis servo coil, that is, the focusing servo coil Cz is wound so as to surround the optical axis of the lens system 3. The x-axis direction servo coils Cx and the y-axis direction servo coils Cy are disposed to be orthogonal with each other and are respectively wound with the x axis direction and the y axis direction being perpendicular to each other and to the z axis direction as the centers, respectively.

The magnet unit 13 is constituted by a z-axis direction servo magnet, that is, focusing servo magnet 13z, an x-axis direction servo magnet 13x and a y-axis direction servo magnet 13y which have been magnetized so as to move the servo coils Cx, Cy and Cz to the x, y and z axis directions when they are energized by servo currents applied thereto, respectively.

According to the thus constituted actuator 5, the coil block 14, that is, the condenser lens system 3 can be moved along the x, y and z axes due to the interaction between the magnetic fields generated by the energization of the servo coils Cx, Cy and Cz and the magnetic fields generated by the magnets 13x, 13y and 13z of the magnet unit 13, respectively.

The astigmatism generator 11 may be constituted by applying a so-called astigmatism method thereto in a manner that it generates the astigmatism when an incident beam is deviated from its predetermined optical axis by utilizing a well known technique, e.g., a cylindrical lens.

Output signals A to D respectively obtained from the four photo diodes 10A to 10D of the optical detector 10 are applied to an operation circuit 15 which in turn operates these input signals to thereby generate respective output signals $A+C-(B+D)$, $A+B-(C+D)$ and $A+D-(B+C)$.

In the thus constituted optical guide end-fire coupling apparatus, in order to optically couple the light source section 4 to the optical guide device 1, the light source section 4 is firstly adjusted so that the optical axis (z axis) of the laser beam L substantially coincides with the center of the light incident end facet 2a of the optical guide 2.

In this state, the laser beam L emitted from the semiconductor laser 6 is irradiated on the end facet 1a of the optical guide device 1 through the condenser lens system 3. Then, the return beam reflected from the end facet 1a is incident on the optical detector 10 through the condenser lens system 3, half mirror 8, condenser lens system 9 and astigmatism generator 11.

In fact, an antireflective coating AR is provided, for example, on the end facet 1a of the optical guide device 1. Thus, reflectivity of the laser beam, that is, the optical intensity of the return beam differs between the case where the laser beam L is focused on the optical guide 2 and the case where it is focused on a portion of the end facet 1a where the optical guide 2 is not provided.

If the optical guide device 1 is, for example, an SHG which is so constructed that the nonlinear optical crystal substrate is is made of material such as lithium niobate whose refractive index is about in a range between 2.1 and 2.2, then the optical guide 2 with a refractive index increasing ratio of about from 3 to 4% is formed on the substrate 1s. In this case, a spattering film of $SiO_2$, e.g., a single film with a refractive index $n=1.45$ is deposited on the end facet 1a to form the antireflective coating AR. In case of focusing a laser beam L of 100 mW on the end facet 1a of the thus constituted optical guide device 1, the light quantity of the return beam will be about 100 $\mu W$ when it is focused on a portion of the end facet 1a where the optical guide 2 is not provided, while the light quantity of the return beam will be not larger than about 2 $\mu W$ when it is focused on a portion of the end facet 1a where the optical guide 2 is provided. Thus, the light quantity of the return beam changes at maximum by about five times of the minimum light quantity thereof depending on the focusing position on the end facet 1a.

Therefore, the detection of changes in the light quantity of the return beam makes it possible to determine at least whether or not the laser beam L is focused on a portion of the end facet 1a where the optical guide 2 is provided.

FIGS. 3A and 3C show beam spot images S of the return beam which is returned by the end facet 1a, then passed through the astigmatism generator 11 and focused on the photo detector 10 having the four photo diodes 10A to 10D, in the cases where the distance between the condenser lens system 3 and the end facet 1a is shorter and longer than the focal length of the condenser lens system 3, that is, over focusing and under focusing states, respectively. FIG. 3B shows a just focusing state, for example.

Figure 6:
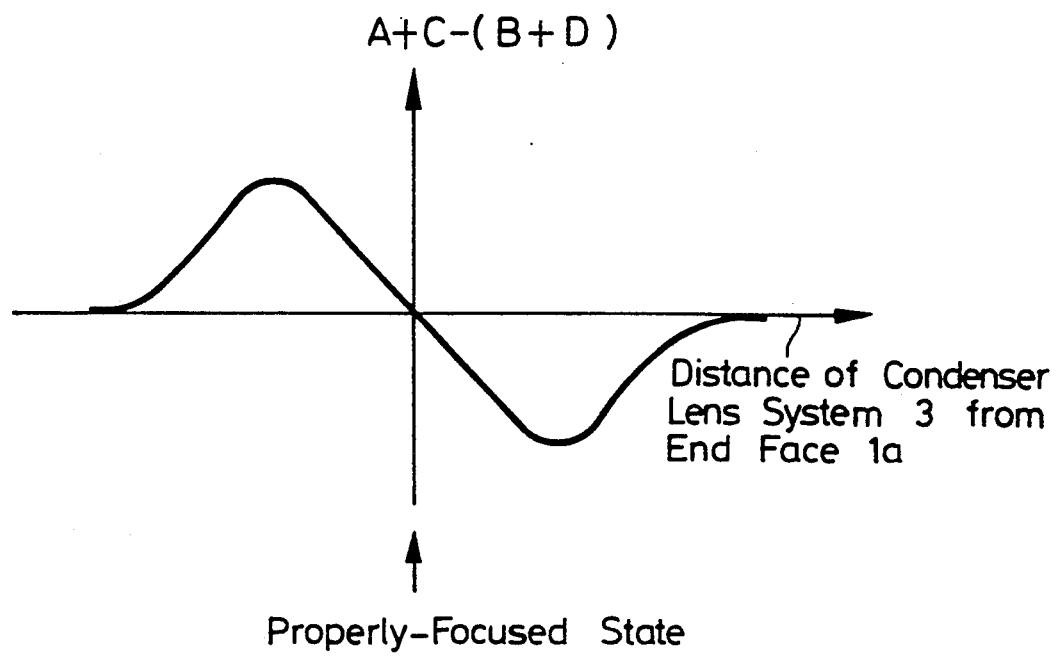
FIG. 6 is a schematic diagram illustrating the output characteristics of an operation circuit showing a relation between an output signal value thereof and a distance between a condenser lens system and an end facet of an optical guide device.

FIG. 6 illustrates the output characteristics of the operation circuit 15 showing a relation between an output signal value $A+C-(B+D)$ and the focusing states, that is, a distance between the condenser lens system 3 (object lens thereof) and the end facet 1a of the optical guide device 1.

In the over focusing state, the beam spot S becomes an elliptic configuration whose major axis is along the x1 axis and whose minor axis is along the y1 axis as shown by slanted lines in FIG. 3A. In the under focusing state, the beam spot S becomes another elliptic configuration whose major axis is along the y1 axis and whose minor axis is along the x1 axis as shown by slanted lines in FIG. 3C. Further, in the just focusing state, the beam spot S becomes a circular configuration having the same diameter to the x1 axis and y1 axis directions, that is, symmetric configuration with respect to the center axis, as shown by slanted lines in FIG. 3B. Thus, as shown in FIG. 6, the output signal value $A+C-(B+D)$ of the operation circuit 15 will be 0 in the just focusing state. On the other hand, the output signal value $A+C-(B+D)$ of the operation circuit 15 will be shifted in positive and negative directions in accordance with the deviation between the focal length of the condenser lens system 3 and the distance between the condenser lens system 3 and the end facet 1a in the over focusing and under focusing states, respectively.

Thus, the position of the condenser lens system 3 can be adjusted along the z axis direction by applying the output signal value $A+C-(B+D)$ serving as a focusing servo control signal to the z-axis direction servo coil (focusing servo coil) Cz of the actuator 5.

Figure 7:
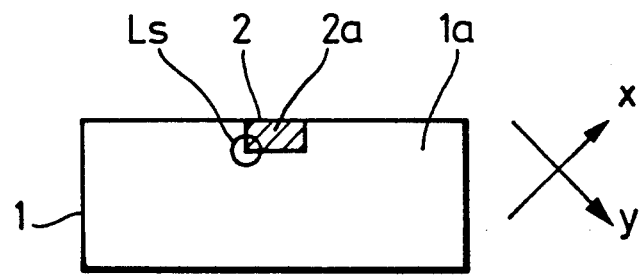
FIG. 7 is a schematic diagram illustrating a state where a converged light spot is partially deviated from the optical guide.
Figure 8:
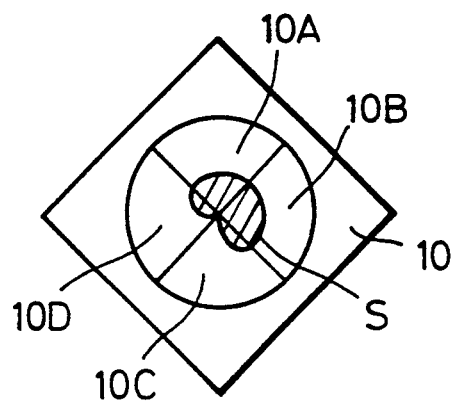
FIG. 8 is a schematic plan view of the photo detector illustrating the return light spot irradiated on the four photo diodes thereof in the case of FIG. 7.

An explanation will now be given for the case where the laser beam L is not correctly irradiated on the light incident end facet 2a of the optical guide 2 facing the end facet 1a of the optical guide device 1. For example, when a laser beam spot Ls by the laser beam L formed on the light incident end 2a is deviated to the x axis direction in the focusing state of the condenser lens system 3 as shown in FIG. 7, the return beam spot irradiated on the four-splitted photo diodes of the photo detector 10 will be a spot S whose brightness is not uniform as shown in FIG. 8.

Figure 9:
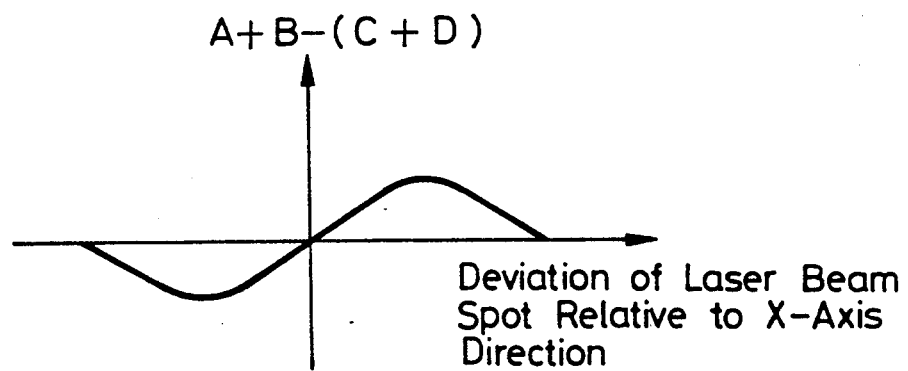
FIG. 9 is a schematic diagram illustrating output characteristics of the operation circuit showing a relation between an output signal value thereof and a deviation of a converged laser beam irradiated on the optical guide in an X direction.

FIG. 9 shows an example of the relation between the output signal value $A+B-(C+D)$ of the operation circuit 15 operated based on the output signals from the four-splitted photo diodes and the deviation of the laser beam spot from the optical guide in the x axis direction. As shown in FIG. 9, the output signal value $A+B-(C+D)$ of the operation circuit 15 will be 0 when the beam spot S is formed in the center of the light incident end facet 2a, and will be a negative or positive output when the beam spot S is deviated in the x axis direction from the center.

Thus, the position of the condenser lens system 3 can be adjusted or servo-controlled in the x-axis direction by applying the output signal value $A+B-(C+D)$ of the operation circuit 15, as an error signal representing the deviation from the optical guide in the x axis direction, to the servo coil Cx. Further, the position of the condenser lens system 3 can be also adjusted or servo-controlled in the y-axis direction by applying an output signal value $A+D-(B+C)$ of the operation circuit 15, as an error signal representing the deviation from the optical guide in the y axis direction, to the servo coil Cy.

Further, as described above, in the case where the beam spot Ls of the converged laser beam L is focused on a portion quite different from the light incident end 2a of the optical guide 2 of the optical guide device 1, each of the above-described error signals is not different from a case where the the beam spot Ls of the converged laser beam L is focused within the light incident end 2a. However, a sum value $A+B+C+D$ of the outputs of the four-splitted photo diodes 10A to 10D representing the sum of light quantities of the return beam irradiated on these diodes differs between these two cases depending on the condition of the antireflective coating AR etc. formed on the end facet 1a of the optical guide device 1.

Thus, these two cases will be distinguished by monitoring the sum value $A+B+C+D$ of the outputs of the four photo diodes 10A to 10D. In other words, the condenser lens system 3 can be positioned correctly at such a position that the the beam spot Ls of the converged laser beam L is focused within the light incident end facet 2a by moving the actuator 5 to a position where the sum value $A+B+C+D$ becomes the minimum value, for example, through the monitoring operation of the sum value.

Now, when the condition of the antireflective coating AR is set on the portion where the optical guide is not provided, the laser beam spot can be positioned within the end facet 2a by moving the actuator 5 to a position where the sum value $A+B+C+D$ becomes the maximum value.

As set out above, according to the present invention, since the laser beam L is focused on the light incident end facet 2a of the optical guide 2 of the optical guide device 1 by the condenser lens system 3 having the actuator 5 and the position of the actuator 5 is controlled finely in accordance with the return beam reflected from the optical guide device so that the condenser lens system 3 is positioned at the most preferable position, it is possible to always make the optical beam be incident stably on the optical guide 2 with the best condition.

Thus, it is possible to obtain a large power of the secondary harmonics when the optical guide end-fire coupling apparatus according to the present invention is applied to the SHG, for example. Further, since the the condenser lens system can be set automatically at the best position surely even when it is deviated from its correct position due to vibration applied thereto or change in ambient temperature or the like, the optical guide end-fire coupling apparatus according to the present invention can always operate stably.

Having described the preferred embodiment of the invention with reference to the accompanying drawings, it is to be understood that the present invention is not limited to that precise embodiment and that various changes and modifications thereof could be effected by one skilled in the art without departing from the spirit or scope of the novel concepts of the invention as defined in the appended claims.

What is claimed is:

1. An optical guide end-fire coupling apparatus including a light source section having a condenser lens system for converging a laser beam to be incident on a first light incident end facet of an optical guide type secondary harmonic generator which is embedded in a substrate having a second light incident end facet which is coplanar with the first light incident end facet, comprising:

an actuator for finely adjusting the position of the condenser lens system with respect to an optical, i.e., a z axis of the condenser lens system, an x axis and a y axis, which axes are all orthogonal with each other; and means for detecting a light intensity of a return beam which is reflected by the first light incident end facet or the second light incident end facet, and for controlling the actuator in accordance with the detected light intensity so that the position of the actuator is adjusted with respect to the x, y and z axes until the laser light beam is focussed on the first light incident end facet.

2. An optical guide end-fire coupling apparatus according to claim 1, further comprising a antireflective coating layer formed on one of the second light incident end facet or the first light incident end facet of the optical guide.

3. An optical guide end-fire coupling apparatus including a light source section having a condenser lens system for converging a laser beam to be incident on a first light incident end facet of an optical guide which is embedded in a substrate having a second light incident end facet, comprising:

an actuator for finely adjusting the position of the condenser lens system with respect to an optical, i.e. a z axis of the condenser lens system, an x axis and a y axis, which axes are all orthogonal with each other;

means for detecting a light intensity of a return beam which is reflected by the second light incident end facet, and for controlling the actuator in accordance with the detected light intensity so that the position of the actuator is adjusted with respect to the x, y and z axes until the laser light beam is focussed on the first light incident end facet;

wherein the means for detecting a light intensity includes:

an astigmatism generator for generating astigmatism when the return beam applied thereto is deviated from its predetermined optical axis, an optical detector split into plural optical detecting units, each for generating a signal in accordance with the return beam applied through the astigmatism generator, and operating means for operating the signals from the plural optical detecting units to obtain the detected light intensity.

4. An optical guide end-fire coupling apparatus according to claim 3, wherein the operating means includes means for obtaining a sum of the signals from the plural optical detecting units, and the means for controlling the actuator includes means for controlling the actuator so that the sum of the signals becomes a maximum or minimum value, thereby making the laser beam emitted rom the light source section be incident in the first light incident end facet of the optical guide.

* * * * *